Aug. 30, 1938.   W. B. BAUER   2,128,577

SPACER FOR AUTOMOBILE HOODS AND ITS SEAT

Filed Sept. 10, 1936

INVENTOR
Walter B. Bauer
BY Staley & Welch
ATTORNEYS

Patented Aug. 30, 1938

2,128,577

UNITED STATES PATENT OFFICE 2,128,577

SPACER FOR AUTOMOBILE HOODS AND ITS SEAT

Walter B. Bauer, Springfield, Ohio

Application September 10, 1936, Serial No. 100,082

3 Claims. (Cl. 20—40.5)

This invention relates to a spacer which may be inserted between an intermediate portion of the rear edge of the upper section of one of the hood members which covers the engine of an automobile and its seat to permit for the passage of a current of warm air from the engine which may be directed on the outer side of the windshield of the automobile for defrosting purposes.

The object of this invention is to provide a device of the character referred to which may be readily secured to the rear edge of the upper section of one of the hood members which will remain in place on the hood member when the same is raised.

A further object of the invention is to provide a device of the character referred to which will be of simple and economical construction, effective for the purpose for which it is designed and which may be readily installed or removed.

I preferably construct my device from moulded comparatively soft vulcanized rubber and it consists of a main body portion 1 having on its upper inner corner an integral flange 2 which is preferably beveled forwardly and downwardly as indicated at 2'. This beveled portion is separated from the main body 1 so as to provide a groove 3 which receives a portion of the inner edge of a member of the hood which covers the engine, a portion of this hood member being indicated at 4. Because of the resilient character of the main body 1 and the beveled portion of the flange, when it is inserted on the edge of the hood member it will be frictionally held thereon, but may be readily removed.

Figure 1:
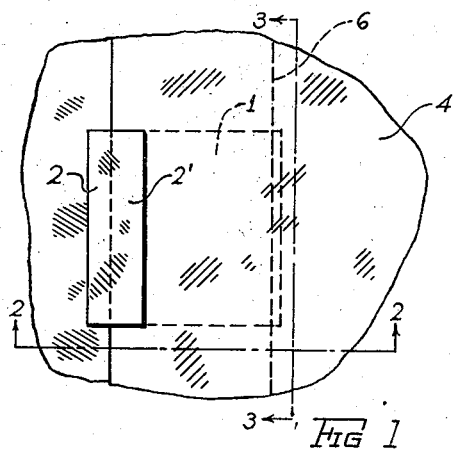
Fig. 1 is a top plan view of a portion of one of the hood members and its seat of an automobile showing my device installed on the hood.
Figure 2:
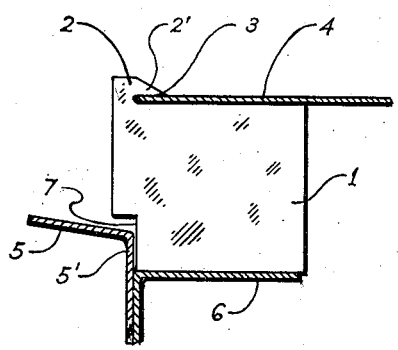
Fig. 2 is a vertical section on the line 2—2 of Fig. 1.
Figure 3:
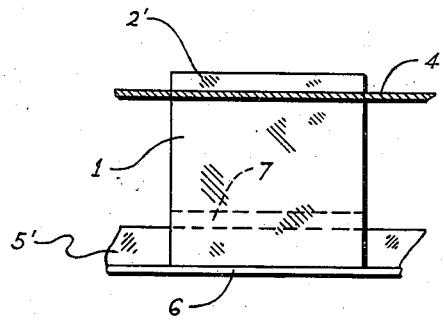
Fig. 3 is a transverse section on the line 3—3 of Fig. 1.

In Figs. 1, 2 and 3 a cowl 5 and its flange 6 of the automobile are of the type which is now usually employed in which the flange 6 is dropped below the cowl so as to permit the inner edge of the hood to lie closely adjacent the vertical portion 5' of the cowl. In order to accommodate my device to such a construction I provide the body portion 1 at its lower inner corner with a recess 7 to permit it to partly overlie the cowl so as to bring the inner end of the groove 3 substantially in line with the vertical edge 5' of the cowl.

Figure 4:
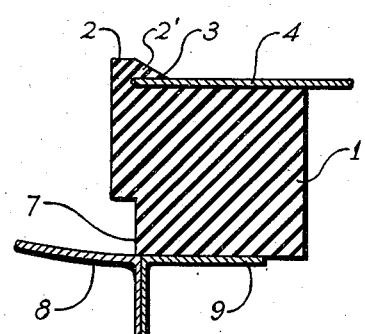
Fig. 4 is a vertical section of my device with a portion of one of the hood members and of the cowl and its flange also in vertical section, the cowl and its flange in this figure being of a modified form from that shown in the other figures.

The cowl and its flange shown in Figs. 1, 2 and 3 is now generally used in all makes of automobiles but the device is equally applicable to an old type cowl and flange such as shown in Fig. 4 in which a portion of the cowl is indicated at 8 and its flange at 9, the flange being substantially flush with the surface of the cowl. When so installed the recess 7, of course, has no useful function but is merely provided so that the device may be readily installed where the cowl and its flange are of the kind illustrated in the other figures.

This device is designed to be used during snowy and sleety weather and may be quickly installed so as to leave a passageway between the hood and the cowl so that warm air from the engine may be projected against the windshield to prevent the accumulation of snow or sleet upon the shield. The device is installed upon that member of the hood which is upon the driver's side of the automobile but it is obvious if desired one of them can be installed upon the other member of the hood.

While I have described the device as being made of comparatively soft vulcanized rubber I do not wish to limit myself to that particular material.

Figure 5:
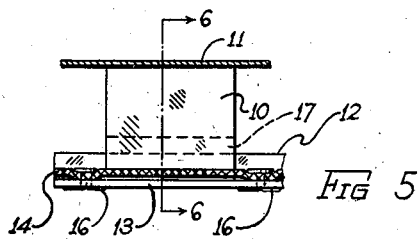
Fig. 5 is a front elevation of a modified form of the device, the hood being shown in section.
Figure 6:
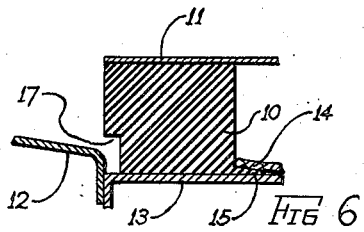
Fig. 6 is a section on the line 6—6 of Fig. 5.

While I have described my spacer as a body portion which is removably secured to the inner edge of a portion of the hood of the automobile, I do not wish to be limited to this particular construction, as it is feasible to attach the spacer removably to the seat for the hood as shown in Figs. 5 and 6. In these figures 10 represents the spacing block, 11 the hood, 12 the cowl and 13 the flange which forms the seat for the hood. It is usual to provide the flange 13 with a packing such as indicated at 14 and in this case the spacing block 10 is provided at its lower forward corner with a lip 15 which is forced beneath the packing 14 between two of the rivets 16 which secure the packing to the flange. In this case block 10 is shown as provided with a recess 17 similar to the recess 7 previously referred to. This recess 17, however, is not intended to overlie the cowl but is merely provided to permit the block to clear the cowl to facilitate installation of the spacer.

Having thus described my invention, I claim:

1. A spacer for the hood of an automobile and its seat consisting of a solid body of resilient vulcanized rubber, said body having an integral extension at its upper inner corner a part of which is separated from the body to form a groove to receive the inner edge of the hood, said separated portion being downwardly inclined in a forward direction, said body being recessed at the lower portion.

2. A spacer for the hood of an automobile and its seat consisting of a solid body of vulcanized rubber and means for securing said body to one of said parts to position said body between the hood and seat to provide for a space for warm air between the hood and its seat.

3. A spacer for the hood of an automobile and its seat in which the seat is provided with packing material, said spacer consisting of a solid body of vulcanized rubber having at its lower forward corner an integral projecting lip adapted to be forced between the seat and its packing.

WALTER B. BAUER.